US011732636B2

(12) United States Patent
Mohlin et al.

(10) Patent No.: US 11,732,636 B2
(45) Date of Patent: Aug. 22, 2023

(54) COOLING SYSTEM AND VEHICLE COMPRISING SUCH A COOLING SYSTEM

(71) Applicant: Scania CV AB, Södertälje (SE)

(72) Inventors: Martin Mohlin, Stockholm (SE); Ola Hall, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/917,814

(22) PCT Filed: May 6, 2021

(86) PCT No.: PCT/SE2021/050420
§ 371 (c)(1),
(2) Date: Oct. 7, 2022

(87) PCT Pub. No.: WO2021/235990
PCT Pub. Date: Nov. 25, 2021

(65) Prior Publication Data
US 2023/0138661 A1    May 4, 2023

(30) Foreign Application Priority Data
May 19, 2020    (SE) .................................. 2050583-0

(51) Int. Cl.
*F01P 11/02*    (2006.01)
*F01P 3/20*     (2006.01)
(Continued)

(52) U.S. Cl.
CPC ............ *F01P 3/20* (2013.01); *B01D 19/0042* (2013.01); *F01P 5/10* (2013.01); *F01P 11/028* (2013.01);
(Continued)

(58) Field of Classification Search
CPC .... F01P 3/20; F01P 5/10; F01P 11/028; F01P 11/029; F01P 2005/105; F01P 2050/22;
(Continued)

(56) References Cited

U.S. PATENT DOCUMENTS

| 4,200,065 A | 4/1980 | Buddenhagen |
| 7,395,787 B1 | 7/2008 | Claypole et al. |
| 2011/0284107 A1 | 11/2011 | Ciak et al. |

FOREIGN PATENT DOCUMENTS

| DE | 19912138 A1 | 9/2000 |
| EP | 3521583 A1 | 8/2019 |

(Continued)

OTHER PUBLICATIONS

Scania CV AB, International Patent Application No. PCT/SE2021/050420, International Search Report, dated Jun. 2, 2021.
(Continued)

*Primary Examiner* — Jacob M Amick
(74) *Attorney, Agent, or Firm* — Moore & Van Allen PLLC; W. Kevin Ransom

(57) ABSTRACT

Disclosed is a cooling system comprising: a first cooling circuit with a first coolant pump; a second cooling circuit with a second coolant pump; an expansion tank provided with an expansion chamber for accumulation of coolant, wherein the expansion chamber is connected to the second cooling circuit to allow the expansion chamber to receive coolant from the second cooling circuit; and a deaeration device arranged in the first cooling circuit for separation of air bubbles from the coolant circulating therein. The deaeration device is located at a lower position than the expansion tank and connected to said expansion chamber via a static line to allow air bubbles separated from the coolant in the deaeration device to migrate upwards in the static line towards the expansion chamber.

19 Claims, 5 Drawing Sheets

(51) Int. Cl.
*B01D 19/00* (2006.01)
*F01P 5/10* (2006.01)

(52) U.S. Cl.
CPC ....... *F01P 11/029* (2013.01); *F01P 2005/105* (2013.01); *F01P 2050/22* (2013.01); *F01P 2050/24* (2013.01)

(58) Field of Classification Search
CPC .... F01P 2050/24; F01P 11/02; B01D 19/0042
See application file for complete search history.

(56) References Cited

FOREIGN PATENT DOCUMENTS

| | | | |
|---|---|---|---|
| FR | 2388133 | A1 | 11/1978 |
| FR | 2905737 | A1 | 3/2008 |
| JP | S6038122 | U | 3/1985 |
| JP | 2020023965 | A * | 2/2020 |
| JP | 2020023965 | A | 2/2020 |
| WO | 03042516 | A2 | 5/2003 |
| WO | 2019113232 | A1 | 6/2019 |

OTHER PUBLICATIONS

Scania CV AB, International Patent Application No. PCT/SE2021/050420, Written Opinion, dated Jun. 2, 2021.
Scania CV AB, Swedish Patent Application No. 2050583-0, Office Action, dated Jan. 29, 2021.
Scania CB AB, International Patent Application No. PCT/SE2021/050420, International Preliminary Report on Patentability, dated Nov. 17, 2022.

\* cited by examiner

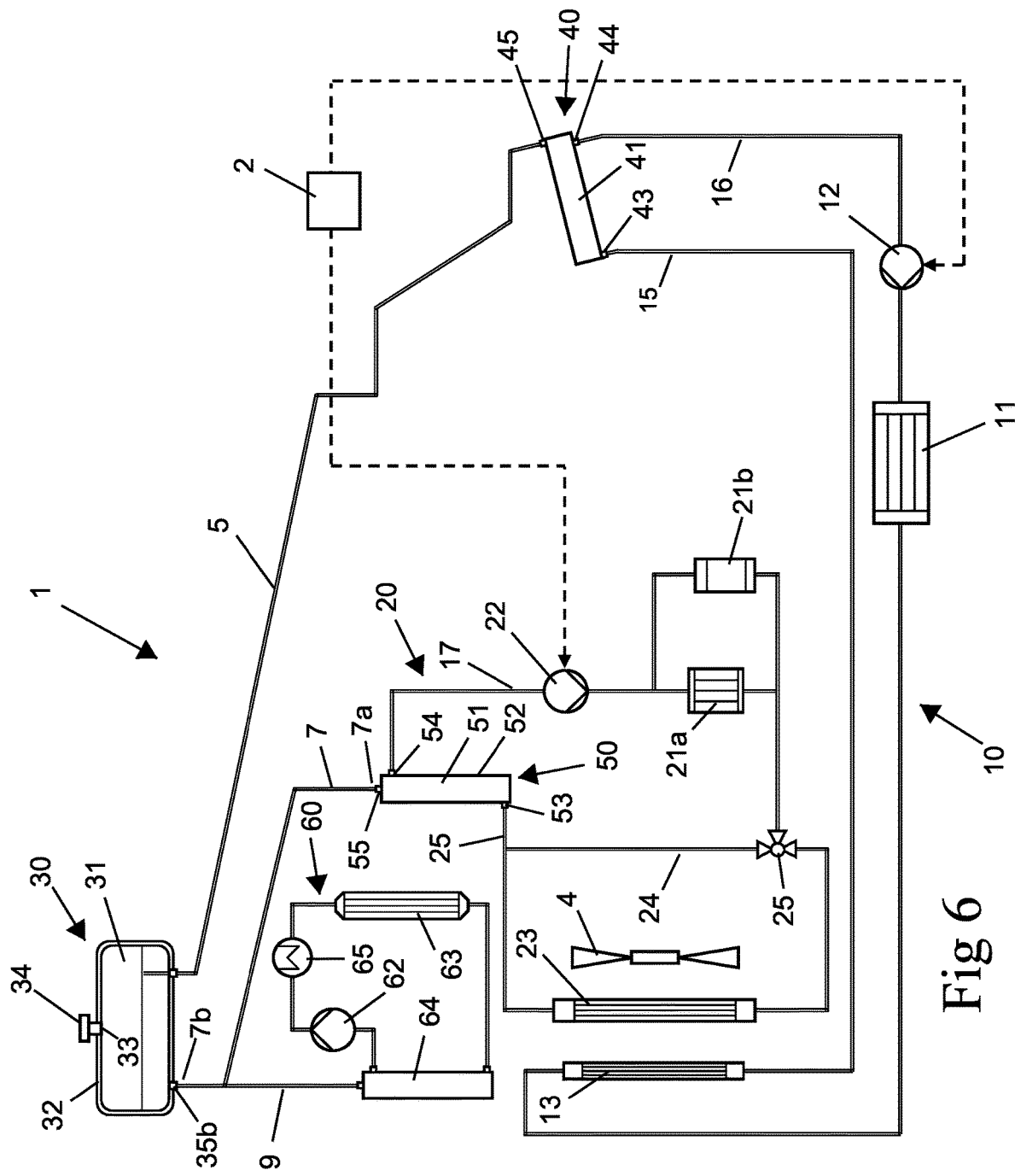

COOLING SYSTEM AND VEHICLE COMPRISING SUCH A COOLING SYSTEM

CROSS-REFERENCE TO RELATED APPLICATIONS

This application is a National Stage Patent Application (filed under 35 § U.S.C. 371) of PCT/SE2021/050420, filed May 6, 2021, of the same title, which, in turn claims priority to Swedish Patent Application No. 2050583-0 filed May 19, 2020, of the same title; the contents of each of which are hereby incorporated by reference.

FIELD OF THE INVENTION

The present invention relates to a cooling system comprising capabilities for separation of air bubbles from coolant in the cooling system and facilitate migration of the air bubbles to an expansion tank.

BACKGROUND

A motor vehicle normally has vehicle components with mutually different cooling requirements, and it is often necessary to use separate cooling circuits for cooling these vehicle components. As an example, a hybrid or fully electric vehicle may comprise an electric energy storing device in the form of an electric battery or a set of electric batteries for supplying electric energy to an electric traction motor of the vehicle and one or more power electronic devices, such as for instance an inverter and a DC/DC converter, for controlling the flow of electric power between the electric energy storing device and the electric traction motor. These types of vehicle components are heated when in use and have to be cooled in order to operate satisfactory. The temperature of the electric batteries of a hybrid or fully electric vehicle should be kept rather low, normally below approximately 40° C., in order to prevent a too rapid aging thereof, whereas an inverter and a DC converter may withstand higher temperatures, normally up to approximately 60-75° C. Therefore, two separate cooling circuits are often used for cooling such vehicle components, wherein a cooling circuit with circulating coolant of lower temperature is used for cooling the electric batteries and another cooling circuit with circulating coolant of higher temperature is used for cooling the inverter and DC converter and other possible power electronic devices which require cooling.

When a vehicle component is cooled by coolant circulating in a cooling circuit, the vehicle component will give off heat to the coolant, which is thereby heated and expanded. The resulting total volume increase of the coolant in the cooling circuit depends on the original coolant volume and the temperature increase. In order to prevent the pressure from increasing too much in the cooling circuit, the cooling circuit is provided with an expansion tank which can accommodate the surplus coolant volume generated in connection with the expansion of the coolant.

Another important function of a conventional expansion tank in a cooling system of the above-mentioned type is that it should be possible for the coolant received in the expansion tank to be deaerated in the expansion tank before leaving the expansion tank. In a conventional cooling system of the type where a cooling circuit is connected to an expansion tank in a motor vehicle, there is a small continuous flow of coolant from the cooling circuit to the expansion tank and from the expansion tank back to the cooling circuit. The air which accompanies the coolant to the expansion tank is intended to rise to the surface of the coolant volume received in the expansion tank in order to accumulate in an air-filled space at an upper part of the expansion tank. Hereby, the coolant in the expansion tank is deaerated. As an alternative, the cooling system may comprise a separate deaeration device which is arranged in the cooling circuit for separation of air bubbles from the coolant circulating in the cooling circuit, wherein the deaeration device is connected to an expansion tank via a static line in order to allow air bubbles separated from the coolant in the deaeration device to migrate upwards in the static line to the expansion tank. A cooling system of the latter type is for instance previously known from U.S. Pat. No. 7,395,787 B1.

In a cooling system of a motor vehicle with two different cooling circuits, it is previously known to use a dual chamber expansion tank with a first expansion chamber for accumulating coolant which circulates in a first cooling circuit of the cooling system and an adjacent second expansion chamber for accumulating coolant which circulates in a second cooling circuit of the cooling system, to thereby save space in the vehicle and reduce the installation costs. Dual chamber expansion tanks of this type are for instance previously known from US 2011/0284107 A1 and WO 2019/113232 A1.

SUMMARY OF THE INVENTION

The object of the present invention is to achieve a further development of a cooling system of the above-mentioned type with two or more separate cooling circuits so as to provide a cooling system that is improved in at least some aspect.

According to the present invention, the above-mentioned object is achieved by means of a cooling system having the features defined in the claims.

The cooling system of the present invention comprises:
a first cooling circuit for cooling at least one first component by means of coolant circulating in the first cooling circuit;
a second cooling circuit for cooling at least one second component by means of coolant circulating in the second cooling circuit;
a first coolant pump for circulating coolant in the first cooling circuit;
a second coolant pump for circulating coolant in the second cooling circuit;
an expansion tank provided with an expansion chamber for accumulation of coolant, wherein this expansion chamber is connected to the second cooling circuit in order to allow the expansion chamber to receive coolant from the second cooling circuit, and
a deaeration device, in the following referred to as the first deaeration device, arranged in the first cooling circuit for separation of air bubbles from the coolant circulating in the first cooling circuit, wherein the first deaeration device is located at a lower position than the expansion tank and connected to said expansion chamber via a static line, in the following referred to as the first static line, in order to allow air bubbles separated from the coolant in the first deaeration device to migrate upwards in the first static line towards the expansion chamber.

In the cooling system of the present invention, two separate cooling circuits of the cooling system are connected to one and the same expansion chamber in the expansion tank included in the cooling system. By using a separate deaeration device in the first cooling circuit and allowing the air bubbles separated from the coolant in this deaeration device to migrate upwards in a static line towards the expansion chamber of the expansion tank, the expansion chamber may receive air from the coolant in the first cooling circuit as well as from the coolant in the second cooling circuit without requiring any flow of coolant from the first cooling circuit to the expansion chamber, which in its turn implies that the first and second cooling circuits may be connected to one and the same expansion chamber in the expansion tank without the occurrence of any mixture in the expansion chamber between coolant from the first cooling circuit and coolant from the second cooling circuit. Thus, it will be possible to maintain different temperature levels in the two cooling circuits despite the fact that they are connected to the same expansion chamber in the expansion tank. When the cooling system is used in a hybrid or fully electric vehicle, the first cooling circuit may be a low temperature cooling circuit for cooling of an electric energy storing device of the vehicle and the second cooling circuit may be a high temperature cooling circuit for cooling of power electronics of the vehicle. The possibility to have the two cooling circuits connected to the same expansion chamber implies that it will be possible to use an expansion tank of a conventional and simple design as a common expansion tank for the cooling circuits, also when the coolant is to be at different temperature levels in the different cooling circuits. Furthermore, the possibility to achieve deaeration of the coolant in the first cooling circuit by means of the first deaeration device without requiring any flow of coolant from the first cooling circuit to the expansion tank implies that it will be possible to dispense with conventional deaeration lines for feeding of coolant from the first cooling circuit to the expansion tank. Such deaeration lines may be rather costly and may also take up a lot of space, and it is consequently of advantage to be able to dispense with the deaeration lines.

The first deaeration device comprises a deaeration chamber, the chamber comprising:
- a coolant inlet connected to a feed pipe of the first cooling circuit in order to allow coolant circulating in the first cooling circuit to flow from the feed pipe into the deaeration chamber via this coolant inlet;
- a first coolant outlet connected to the first coolant pump in order to allow coolant to flow from the deaeration chamber to the first coolant pump via this first coolant outlet, wherein the first coolant pump is arranged immediately downstream of the first coolant outlet;
- a second coolant outlet connected to said expansion chamber via the first static line, wherein the second coolant outlet is located at a higher position than the first coolant outlet.

With a first object being "located at a higher position" than a second object is herein meant that the first object is located at a higher position than the second object relative to a local gravity vector gv when the cooling system is mounted to a vehicle and the vehicle is positioned in an upright use position on a horizontal surface.

With the first coolant pump being arranged "immediately downstream" the first coolant outlet is herein meant that the first coolant pump is the first major component arranged downstream of the first coolant outlet. The first coolant pump need not however be located physically close to the first coolant outlet, even if this is one possibility. With first major component is herein meant that no other component which may produce such an amount of air bubbles that they may have a detrimental effect on the first coolant pump is arranged between the first coolant outlet and the first coolant pump. Another way of putting it is therefore that the first coolant pump is arranged downstream of the first coolant outlet in such a manner that the amount of air bubbles produced in the coolant between the first coolant outlet and the first coolant pump is negligible for the long-term operation of the pump. It is therefore evident that a component such as e.g. a temperature sensor may be arranged between the first coolant outlet and the first coolant pump, since such a component would not affect the coolant flow in such a way as to cause a large amount of air bubbles to be produced. On the other hand, a component such as a heat exchanger may not be arranged between the first coolant outlet and the first coolant pump since a heat exchanger could conceivable cause such a large amount of air bubbles being produced in the coolant that it may be detrimental to the operation of the first coolant pump.

The first coolant pump may be the first component arranged downstream of the first coolant outlet.

A first coolant pipe may be arranged between the first coolant outlet and the first coolant pump. In this case, a first end of the first coolant pipe may be connected to the first coolant outlet and a second end of the first coolant pipe may be connected to an inlet of the first coolant pump.

By having this type of deaeration device the coolant in the first coolant circuit may be deaerated in a simple manner and by placing the first coolant pump immediately downstream of the first coolant outlet it is ensured that no or a minimal amount of air bubbles will reach the first coolant pump. It is well known that air or air bubbles in the coolant is detrimental for pumps, e.g. since it may lead to cavitation which may damage the pump during long-term operation. Therefore, this solution increases the longevity of the system in a simple and cost-efficient manner.

The coolant inlet and the first coolant outlet may e.g. be spaced apart from each other in a longitudinal direction of the deaeration chamber.

According to an embodiment of the invention, the cross-sectional dimension of the deaeration chamber is larger than the cross-sectional dimension of the feed pipe to thereby allow air bubbles carried along with the coolant flowing through the feed pipe to enter the deaeration chamber via the coolant inlet and thereafter migrate in the deaeration chamber to the second coolant outlet.

With this type of deaeration device, the coolant in the first cooling circuit may be deaerated in a simple and efficient manner with the use of a component of simple construction which can be produced at low cost.

The cross-sectional dimension of the deaeration chamber is preferably so much larger than the cross-sectional dimension of the feed pipe that the relationship between the flow velocity of the coolant flowing through the deaeration chamber between the coolant inlet and the first coolant outlet and the flow velocity of the coolant flowing through the feed pipe is 1:2 or lower, preferably 1:3 or lower. Hereby, it will be possible, by a suitable control of the first coolant pump, to adapt the coolant flow through the first cooling circuit in such a manner that the flow velocity of the coolant in the feed pipe is sufficiently high to allow this coolant to move air bubbles forward along the feed pipe and into the deaeration chamber at the same time as the flow velocity of the coolant in the deaeration chamber is sufficiently low to allow said air bubbles to migrate in the deaeration chamber to the second coolant outlet of the deaeration chamber. If the flow velocity of the coolant is too low in the feed pipe, air bubbles may get stuck in the feed pipe. If the flow velocity of the coolant is too high in the deaeration chamber, the coolant may carry along air bubbles out of the deaeration chamber via the first coolant outlet. The first coolant pump may be controlled in such a manner that the coolant circulating in the first cooling circuit is continuously deaerated. However, the first coolant pump may as an alternative be configured to adapt the coolant flow in the first cooling circuit in such a manner that deaeration is effected intermittently or only at specific occasions.

According to another embodiment of the invention, the second coolant outlet is located in such a position in relation to the coolant inlet and the first coolant outlet that the coolant flow in the deaeration chamber between the coolant inlet and the first coolant outlet will move said migrating air bubbles in the longitudinal direction of the deaeration chamber towards the second coolant outlet. Hereby, the air bubbles migrating in the deaeration chamber towards the second coolant outlet do not have to move against the flow direction of the coolant in the deaeration chamber and the coolant flow in the deaeration chamber will consequently not counteract the migration of the air bubbles towards the second coolant outlet. On the contrary, the coolant flow in the deaeration chamber will promote the migration of air bubbles in the deaeration chamber towards the second coolant outlet and an efficient separation of air bubbles from the circulating coolant may thereby be achieved in the deaeration chamber.

According to another embodiment of the invention, the deaeration chamber has an elongated shape and is arranged with its longitudinal axis vertical or inclined in relation to a horizontal plane by an angle of 0-90°, preferably by an angle which is >0° and <=90°, more preferably by an angle of 10-90°, most preferably 15-90°. A deaeration device with such a deaeration chamber has a rather simple construction and can be produced in a simple and cost-efficient manner. By horizontal plane is herein meant the plane whose normal is parallel to the prevailing gravitational vector. When the deaeration chamber is arranged with its longitudinal axis inclined at an angle greater than 0° in relation to the horizontal plane, air bubbles may rise in the deaeration chamber and hit an inclined upper wall surface in the deaeration chamber, whereupon the air bubbles are conveyed along this wall surface towards the second coolant outlet under the effect of the coolant flow in the deaeration chamber between the coolant inlet and the first coolant outlet. Additionally, even at very low flow, air bubbles which have separated from the coolant will rise towards the static line due to the buoyancy of the air bubbles. Thus, an improved deaeration will be achieved. By having the inclination between 10-90° the chamber will, in most cases, be inclined towards the horizontal plane even if the vehicle is travelling on a downwards slope. Thereby the above described effect is still maintained even if the vehicle is moving in hilly terrain. By having the inclination between 15-90° it is ensured that the chamber will be inclined in relation to the horizontal plane for a great majority of a standard trip. This ensures that the deaeration of the cooling system is functioning optimally at practically all times, thereby minimizing the risk of detrimental effects due to air bubbles in the system. The inclination may also be 10-80° or 15-75° so as to take both upwards and downwards slope into consideration.

According to another embodiment of the invention, the first static line has a lower end and an upper end, wherein the first static line is connected to the first deaeration device at its lower end and wherein:
the first static line slopes upwards along its entire length from its lower end to its upper end, or
the first static line is formed by several interconnected length sections which are arranged in series with each other and which consist of one or more first length sections, each of which sloping upwards as seen in a direction along the first static line from its lower end towards its upper end, and one or more horizontal second length sections.

Hereby, the first static line lacks downwardly sloping sections that could prevent air bubbles from migrating from the first deaeration device towards the expansion chamber of the expansion tank.

According to another embodiment of the invention, the cooling system also comprises a second deaeration device arranged in the second cooling circuit for separation of air bubbles from the coolant circulating in the second cooling circuit, wherein the second deaeration device is located at a lower position than the expansion tank and connected to said expansion chamber via a second static line in order to allow air bubbles separated from the coolant in the second deaeration device to migrate upwards in the second static line towards the expansion chamber. By using a separate deaeration device also in the second cooling circuit and allowing the air bubbles separated from the coolant in this deaeration device to migrate upwards in the second static line towards the expansion chamber of the expansion tank, the expansion chamber may receive air from the coolant in the second cooling circuit without requiring any flow of coolant from the second cooling circuit to the expansion chamber, which in its turn implies that it will be possible to dispense with conventional deaeration lines for feeding of coolant from the second cooling circuit to the expansion tank.

According to another embodiment of the invention, the second deaeration device comprises a deaeration chamber having:
a coolant inlet connected to a feed pipe of the second cooling circuit in order to allow coolant circulating in the second cooling circuit to flow from this feed pipe into the deaeration chamber of the second deaeration device via this coolant inlet;
a first coolant outlet connected to the second coolant pump in order to allow coolant to flow from the deaeration chamber of the second deaeration device to the second coolant pump via this first coolant outlet, wherein the second coolant pump is arranged immediately downstream of the first coolant outlet; and
a second coolant outlet connected to said expansion chamber via the second static line and located at a higher position than the first coolant outlet of the deaeration chamber of the second deaeration device,
wherein the cross-sectional dimension of the deaeration chamber of the second deaeration device is larger than the cross-sectional dimension of the feed pipe of the second cooling circuit to thereby allow air bubbles carried along with the coolant flowing through the feed pipe of the second cooling circuit to enter the deaeration chamber of the second deaeration device via the coolant inlet and thereafter migrate in this deaeration chamber to the second coolant outlet.

With this type of deaeration device, the coolant in the second cooling circuit may be deaerated in a simple and efficient manner with the use of a component of simple construction which can be produced at low cost.

With the second coolant pump being arranged "immediately downstream" the first coolant outlet is herein meant that the second coolant pump is the first major component arranged downstream of the first coolant outlet. The first coolant pump need not however be located physically close to the first coolant outlet, even if this is one possibility. With first major component is herein meant that no other component which may produce such an amount of air bubbles that they may have a detrimental effect on the second coolant pump is arranged between the first coolant outlet and the second coolant pump. Another way of putting it is therefore that the second coolant pump is arranged downstream of the first coolant outlet in such a manner that the amount of air bubbles produced in the coolant between the first coolant outlet and the second coolant pump is negligible for the long-term operation of the second coolant pump. It is therefore evident that a component such as e.g. a temperature sensor may be arranged between the first coolant outlet and the second coolant pump, since such a component would not affect the coolant flow in such a way as to cause a large amount of air bubbles to be produced. On the other hand, a component such as a heat exchanger may not be arranged between the first coolant outlet and the second coolant pump since a heat exchanger could conceivable cause such a large amount of air bubbles being produced in the coolant that it may be detrimental to the operation of the second coolant pump.

The second coolant pump may be the first component arranged downstream of the first coolant outlet.

A second coolant pipe may be arranged between the first coolant outlet and the second coolant pump. In this case, a first end of the second coolant pipe may be connected to the first coolant outlet and a second end of the second coolant pipe may be connected to an inlet of the second coolant pump.

By having this type of deaeration device the coolant in the second coolant circuit may be deaerated in a simple manner and by placing the second coolant pump immediately downstream of the first coolant outlet it is ensured that no or a minimal amount of air bubbles will reach the second coolant pump. It is well known that air or air bubbles in the coolant is detrimental for pumps, e.g. since it may lead to cavitation which may damage the pump during long-term operation. Therefore, this solution increases the longevity of the system in a simple and cost-efficient manner.

The coolant inlet and the first coolant outlet of the deaeration chamber of the second deaeration device may be spaced apart from each other in a longitudinal direction of this deaeration chamber.

According to another embodiment on the invention, the cross-sectional dimension of the deaeration chamber of the second deaeration device is larger than the cross-sectional dimension of the feed pipe of the second cooling circuit such that the relationship between the flow velocity of the coolant flowing through this deaeration chamber between the coolant inlet and the first coolant outlet and the flow velocity of the coolant flowing through this feed pipe is 1:2 or lower, preferably 1:3 or lower. Hereby, it will be possible, by a suitable control of the second coolant pump, to adapt the coolant flow through the second cooling circuit in such a manner that the flow velocity of the coolant in the feed pipe of the second cooling circuit is sufficiently high to allow this coolant to move air bubbles forward along the feed pipe and into the deaeration chamber of the second deaeration device at the same time as the flow velocity of the coolant in this deaeration chamber is sufficiently low to allow said air bubbles to migrate in the deaeration chamber to the second coolant outlet of the deaeration chamber. The second coolant pump may be controlled in such a manner that the coolant circulating in the second cooling circuit is continuously deaerated. However, the second coolant pump may as an alternative be configured to adapt the coolant flow in the second cooling circuit in such a manner that deaeration is effected intermittently or only at specific occasions.

According to another embodiment on the invention, the second coolant outlet of the deaeration chamber of the second deaeration device is located in such a position in relation to the coolant inlet and the first coolant outlet of this deaeration chamber that the coolant flow in this deaeration chamber between the coolant inlet and the first coolant outlet will move said migrating air bubbles in the longitudinal direction of this deaeration chamber towards the second coolant outlet. Hereby, the air bubbles migrating in the deaeration chamber of the second deaeration device towards the second coolant outlet do not have to move against the flow direction of the coolant in this deaeration chamber and the coolant flow in this deaeration chamber will consequently not counteract the migration of the air bubbles towards the second coolant outlet. On the contrary, the coolant flow in the deaeration chamber of the second deaeration device will promote the migration of air bubbles in this deaeration chamber towards the second coolant outlet and an efficient separation of air bubbles from the circulating coolant may thereby be achieved in this deaeration chamber.

According to another embodiment on the invention, the deaeration chamber of the second deaeration device has an elongated shape and is arranged with its longitudinal axis vertical or inclined in relation to a horizontal plane by an angle of 0-90°, preferably by an angle which is >0° and <=90°, more preferably by an angle of 10-90°, most preferably 15-90°. The advantages associated with having the deaeration device inclined in such a manner have been described above and will not be repeated here for sake of brevity. Similarly, the inclination may also be 10-80° or 15-75° so as to take both upwards and downwards slope into consideration.

According to another embodiment on the invention, the second static line has a lower end and an upper end, wherein the second static line is connected to the second deaeration device at its lower end and wherein:

the second static line slopes upwards along its entire length from its lower end to its upper end, or the second static line is formed by several interconnected length sections which are arranged in series with each other and which consist of one or more first length sections, each of which sloping upwards as seen in a direction along the second static line from its lower end towards its upper end, and one or more horizontal second length sections.

The cooling system may comprise a radiator for cooling of coolant circulating in the first cooling circuit and/or a radiator for cooling of coolant circulating in the second cooling circuit.

Further advantageous features of the cooling system according to the present invention will appear from the description following below.

The invention also relates to a vehicle having the features defined in the claims.

Further advantageous features of the vehicle according to the present invention will appear from the description following below.

BRIEF DESCRIPTION OF THE DRAWINGS

With reference to the appended drawings, a specific description of embodiments of the invention cited as examples follows below. In the drawings:

FIG. 6 is an outline diagram of a cooling system according to a fifth embodiment of the invention.

DETAILED DESCRIPTION OF EMBODIMENTS OF THE INVENTION

Figures 1, 2:
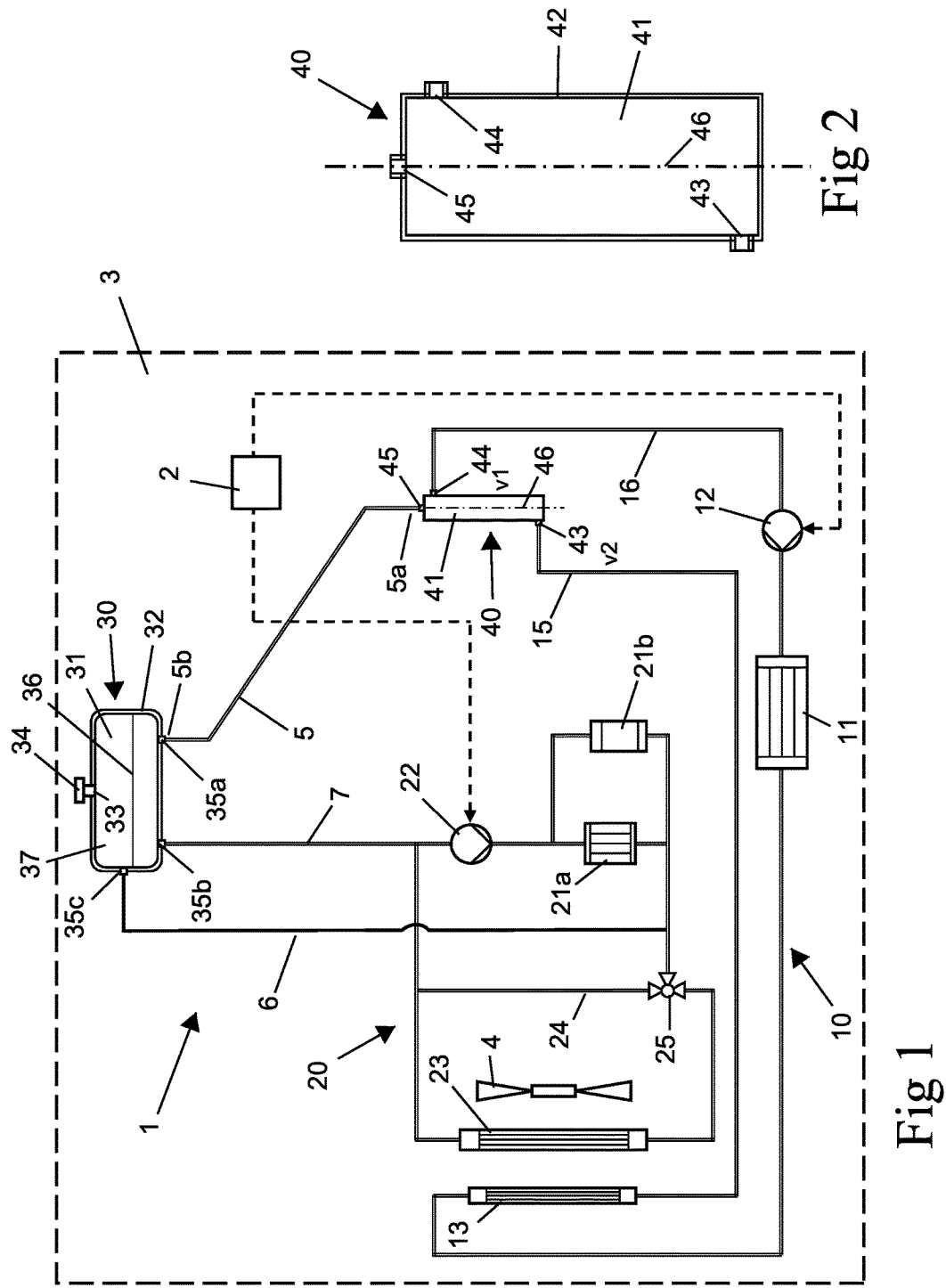
FIG. 1 is an outline diagram of a cooling system according to a first embodiment of the present invention.
FIG. 2 is a schematic vertical section through a deaeration device included in the cooling system of FIG. 1.

A cooling system 1 according to an embodiment of the present invention is very schematically illustrated in FIG. 1. The cooling system 1 comprises a first cooling circuit 10 for cooling at least one first component 11 by means of coolant circulating in the first cooling circuit and a second cooling circuit 20 for cooling at least one second component 21a, 21b by means of coolant circulating in the second cooling circuit. The coolant flowing through the first and second cooling circuits 10, 20 is preferably water, possibly with anti-freezing additives such as for instance glycol. A first coolant pump 12 is provided in the first cooling circuit 10 in order to circulate the coolant in the first cooling circuit and a second coolant pump 22 is provided in the second cooling circuit 20 in order to circulate the coolant in the second cooling circuit. The first and second coolant pumps 12, 22 are preferably electrically driven pumps. The cooling system 1 may further comprise an electronic control unit 2 which is connected to the first and second coolant pumps 12, 22 and configured to control the operation thereof so as to thereby control the flow velocities of the coolant circulating in the first and second cooling circuits 10, 20.

Furthermore, a cooling device 13, 23, for instance in the form of a heat exchanger, is provided in each cooling circuit 10, 20 in order to remove heat from the coolant circulating therein. The cooling system 1 may for instance be used in a motor vehicle 3, for instance in the form of a hybrid or fully electric vehicle, wherein each cooling device 13, 23 may have the form of a radiator, for instance a conventional coolant radiator. In this case, the first cooling circuit 10 may be a low temperature cooling circuit for cooling a vehicle component in the form of an electric energy storing device 11, such as for instance an electric battery or a set of electric batteries, for supplying electric energy to an electric traction motor of the vehicle, whereas the second cooling circuit 20 may be a high temperature cooling circuit for cooling vehicle components in the form of power electronic devices, such as for instance an inverter 21a and a DC converter 21b, for controlling the flow of electric power between the electric energy storing device 11 and the electric traction motor.

In the illustrated embodiment, the second cooling circuit 20 comprises a radiator bypass line 24 and a valve device 25 for controlling the coolant flow through the radiator 23 and the bypass line 24. The coolant flowing through any of the radiators 13, 23 is cooled by means of ambient air which is blown towards the radiators when the vehicle 3 is in motion. The vehicle 3 may also be provided with a fan 4, which, when so needed, may be operated in order to generate an air flow through the radiators 13, 23. Even though the radiators 13, 23 are depicted in FIG. 1 as being arranged in-line and being fed by air from the common fan 4 it is of course also possible to arrange the radiators 13, 23 distanced from each other and being fed by air from separate individual fans.

The cooling system 1 comprises an expansion tank 30 provided with an expansion chamber 31 for accumulation of coolant, wherein this expansion chamber 31 is surrounded by an external casing 32 of the expansion tank. The expansion tank 30 is provided with a closable refill opening 33 which is arranged in the casing 32 at an upper part thereof. Coolant may be introduced into the expansion chamber 31 via this refill opening 33 in order to provide for replenishment of the cooling system. The refill opening 33 is closed by means of a removable lid 34. Furthermore, the expansion tank 31 is provided with a valve device (not shown) which comprises a pressure relief valve for limiting the pressure in the expansion chamber 31 and a return valve. This valve device may be arranged in the lid 34 or in the casing 32. The pressure relief valve allows air and coolant to flow out from the upper part of the expansion chamber 31 when the pressure in the expansion chamber, due to an increase of the coolant volume, exceeds a pressure level given by the pressure relief valve. Thus, the pressure relief valve ensures that the pressure in the expansion chamber 31 cannot exceed a predetermined pressure level. The return valve allows air to flow into the upper part of the expansion chamber 31 from the surroundings when the pressure in the expansion chamber, due to a reduction of the coolant volume, becomes lower than a pressure level given by the return valve.

The expansion chamber 31 is connected to the second cooling circuit 20 in order to allow the expansion chamber 31 to receive coolant from the second cooling circuit 20.

The cooling system 1 comprises a deaeration device 40 arranged in the first cooling circuit 10 for separation of air bubbles from the coolant circulating in the first cooling circuit, wherein this deaeration device 40 is located at a lower position than the expansion tank 30 and connected to the expansion chamber 31 of the expansion tank 30 via a first static line 5 in order to allow air bubbles separated from the coolant in the deaeration device 40 to migrate upwards in the first static line 5 towards the expansion chamber 31. In the embodiment illustrated in FIG. 1, the first static line 5 is connected directly to the expansion chamber 31 via a first opening 35a provided in the casing 32 of the expansion tank.

Figure 4:
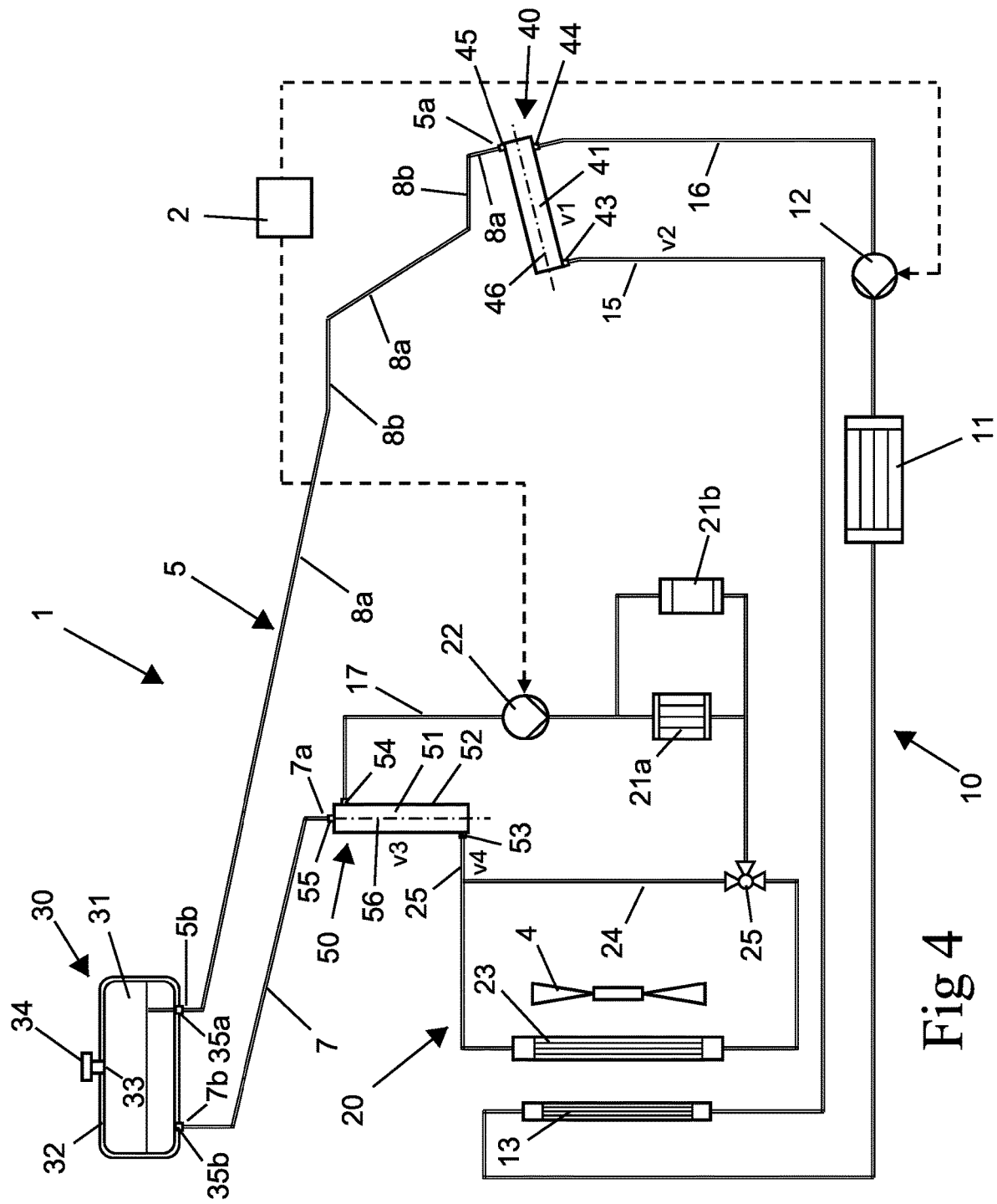
FIG. 4 is an outline diagram of a cooling system according to a third embodiment of the invention.

The first static line 5 has a lower end 5a and an upper end 5b, wherein the first static line 5 is connected to the deaeration device 40 at its lower end 5a. In the embodiment illustrated in FIG. 1, the first static line 5 slopes upwards along its entire length from its lower end 5a to its upper end 5b. However, as illustrated in FIG. 4, the first static line 5 may as an alternative consist of a combination of one or more first length sections 8a, each of which sloping upwards as seen in a direction along the first static line from its lower end towards its upper end, and one or more horizontal second length sections 8b, wherein these first and second length sections 8a, 8b are interconnected and arranged in series with each other.

In the embodiment illustrated in FIG. 1, the expansion chamber 31 is connected to the second cooling circuit 20 via a deaeration line 6 and a second static line 7. When the second coolant pump 22 is in operation and circulates coolant in the second cooling circuit 20, a small flow of coolant is in this case continuously directed from the second cooling circuit 20 to the expansion chamber 31 via the deaeration line 6 and returned from the expansion chamber 31 to the second cooling circuit 20 via the second static line 7. Air bubbles that are accompanying the coolant into the expansion chamber 31 via the deaeration line 6 are allowed to migrate towards the surface 36 of the coolant in the expansion chamber and the air included in these air bubbles is accumulated in an air-filled space 37 at the upper part of the expansion chamber 31. Thus, in this case, the deaeration of the coolant in the second cooling circuit 20 is effected in the expansion tank 30, whereas the deaeration of the coolant in the first cooling circuit 10 is effected in the deaeration device 40. However, the air separated from the coolant in the first cooling circuit 10 is accumulated in the expansion chamber 31 of the expansion tank together with the air separated from the coolant in the second cooling circuit 20. In the illustrated example, the second static line 7 is connected directly to the expansion chamber 31 via a second opening 35b provided in the casing 32 of the expansion tank and the deaeration line 6 is connected directly to the expansion chamber 31 via a third opening 35c provided in the casing 32. As an alternative, the deaeration line 6 may instead be connected to the second static line 7 and thereby indirectly connected to the expansion chamber 31 via the second static line. In the latter case, the air bubbles accompanying coolant from the deaeration line 6 into the second static line 7 are allowed to migrate upwards in the second static line 7 towards the expansion chamber 31.

In the embodiment illustrated in FIG. 1, the deaeration device 40 comprises a deaeration chamber 41 (see FIG. 2), which is enclosed by a casing 42 and which has:
- a coolant inlet 43 connected to a feed pipe 15 of the first cooling circuit 10 in order to allow coolant circulating in the first cooling circuit to flow from the feed pipe 15 into the deaeration chamber 41 via this coolant inlet 43;
- a first coolant outlet 44 connected to the first coolant pump 12 in order to allow coolant to flow from the deaeration chamber 41 to the first coolant pump 12 via this first coolant outlet 44, wherein the first coolant pump 12 is arranged immediately downstream of the first coolant outlet; and
- a second coolant outlet 45 connected to the expansion chamber 31 via the first static line 5 and located at a higher position than the first coolant outlet 44.

The coolant inlet 43 and the first coolant outlet 44 are spaced apart from each other in a longitudinal direction of the deaeration chamber 41.

In the embodiment illustrated in FIG. 1, the first coolant outlet 44 is connected to a first end of a first coolant pipe 16 and an inlet of the first coolant pump 12 is connected to a second end of the first coolant pipe 16.

The second coolant outlet 45 is located in an upper part of the deaeration chamber 41 in order to allow air bubbles that have migrated to the upper part of the deaeration chamber to leave the deaeration chamber and enter the first static line 5 via the second coolant outlet 45. Air bubbles may hereby be separated from the coolant in the first cooling circuit 10. The second coolant outlet 45 is preferably located at the highest point in the deaeration chamber 41, but it may as an alternative be located slightly below the highest point in the deaeration chamber 41.

The cross-sectional dimension of the deaeration chamber 41 is larger than the cross-sectional dimension of the feed pipe 15 such that the flow velocity of the coolant in the deaeration chamber 41 is lower than the flow velocity of the coolant in the feed pipe 15 leading to the deaeration chamber, to thereby allow air bubbles to be carried along with the rather rapid coolant flow in the feed pipe 15 and enter the deaeration chamber 41 via the coolant inlet 43 and thereafter migrate in the deaeration chamber 41 to the second coolant outlet 45. The slower coolant flow in the deaeration chamber 41 will give the coolant an increased dwell time in the deaeration chamber, which in its turn will give air bubbles in the coolant a chance to migrate in the deaeration chamber 41 to the second coolant outlet 45.

The cross-sectional dimension of the deaeration chamber 41 is preferably so much larger than the cross-sectional dimension of the feed pipe 15 that the relationship between the flow velocity v1 of the coolant flowing through the deaeration chamber 41 between the coolant inlet 43 and the first coolant outlet 44 and the flow velocity v2 of the coolant flowing through the feed pipe 15 is 1:2 or lower, preferably 1:3 or lower.

The deaeration chamber 41 may have a cylindrical shape, for instance a circular cylindrical shape, but it may as an alternative have any other suitable shape.

The electronic control unit 2 may be configured to control the first coolant pump 12 in such a manner that the flow velocity of the coolant circulating through the first cooling circuit 10 is maintained at such a value during normal operating conditions that the first cooling circuit is continuously deaerated during the normal operating conditions. However, the electronic control unit 2 may as an alternative be configured to control the first coolant pump 12 in such a manner that the flow velocity intermittently or only at specific occasions is set to a value adapted for an efficient deaeration of the coolant in the first cooling circuit 10.

The second coolant outlet 45 is preferably located in such a position in relation to the coolant inlet 43 and the first coolant outlet 44 that the coolant flow in the deaeration chamber 41 between the coolant inlet 43 and the first coolant outlet 44 will move migrating air bubbles in the deaeration chamber 41 in the longitudinal direction of the deaeration chamber 41 towards the second coolant outlet 45. Thus, in this case, the migration direction of the air bubbles in the deaeration chamber 41 corresponds to the flow direction of the coolant in the deaeration chamber 41 and the coolant flow in the deaeration chamber 41 will thereby promote the movement of the air bubbles towards the second coolant outlet 45.

In the embodiment illustrated in FIGS. 1 and 2, the deaeration chamber 41 has an elongated shape and is arranged with its longitudinal axis 46 extending in vertical direction. In this case, the above-mentioned flow direction of the coolant in the deaeration chamber 41 is achieved by having the coolant inlet 43 located at a lower position than the first coolant outlet 44, which gives an upwardly directed coolant flow in the deaeration chamber 41. However, the deaeration chamber 41 may as an alternative be arranged with its longitudinal axis 46 inclined in relation to a horizontal plane by an angle α of 0-90°, e.g. by an angle which is >0° and <=90°, or an angle between 10-90° or 15-90°. When the deaeration chamber 41 is arranged with its longitudinal axis 46 inclined, for instance in the manner illustrated in FIG. 3, air bubbles may rise in the deaeration chamber 41 and hit an inclined upper wall surface 47 in the deaeration chamber, whereupon the air bubbles are conveyed along this wall surface 47 towards the second coolant outlet 45 under the effect of the coolant flow in the deaeration chamber 41 between the coolant inlet 43 and the first coolant outlet 44.

Figure 3:
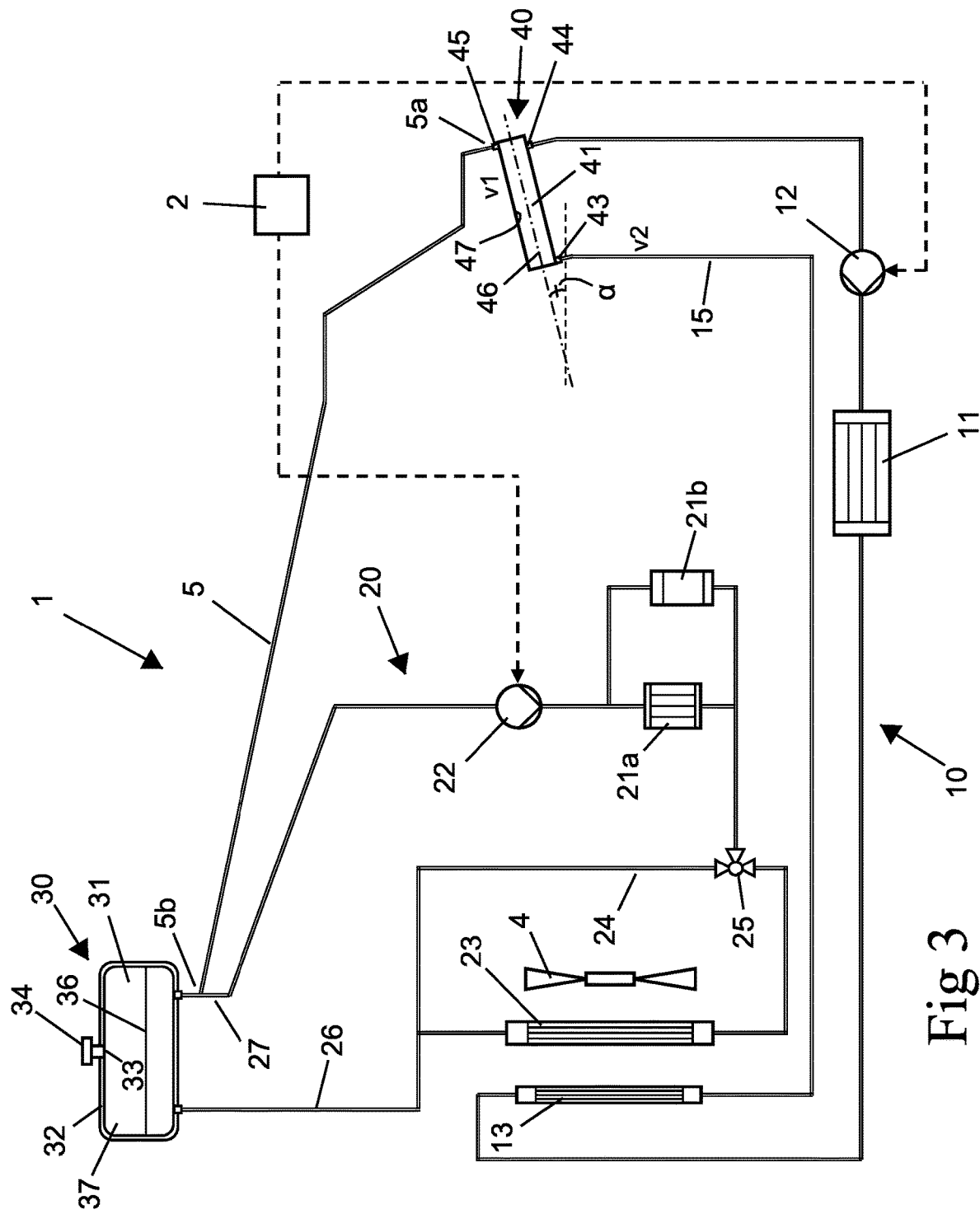
FIG. 3 is an outline diagram of a cooling system according to a second embodiment of the invention.

In the embodiment illustrated in FIG. 3, the coolant in the second cooling circuit 20 circulates through the expansion chamber 31 of the expansion tank 30, wherein the circulating coolant is directed to the expansion chamber 31 by a first coolant line 26 included in the second cooling circuit and directed from the expansion chamber 31 towards the second coolant pump 22 by a second coolant line 27 included in the second cooling circuit. Air bubbles that are accompanying the coolant into the expansion chamber 31 via said first coolant line 26 are allowed to migrate towards the surface 36 of the coolant in the expansion chamber and the air included in these air bubbles is accumulated in an air-filled space 37 at the upper part of the expansion chamber 31. Thus, in this case, the deaeration of the coolant in the second cooling circuit 20 is effected in the expansion tank 30.

In the embodiment illustrated in FIG. 3, the first static line 5 is indirectly connected to the expansion chamber 31 by having its upper end 5b connected to said second coolant line 27 of the second cooling circuit 20. Air bubbles entering the second coolant line 27 from the first static line 5 may migrate upwards in the second coolant line 27 towards the expansion chamber 31 if the flow velocity of the coolant circulating in the second cooling circuit 20 is low enough. If the flow velocity of the coolant circulating in the second cooling circuit 20 is higher, said air bubbles will move along with the coolant circulating in the second cooling circuit and enter the expansion chamber 31 via the above-mentioned first coolant line 26.

Figure 5:
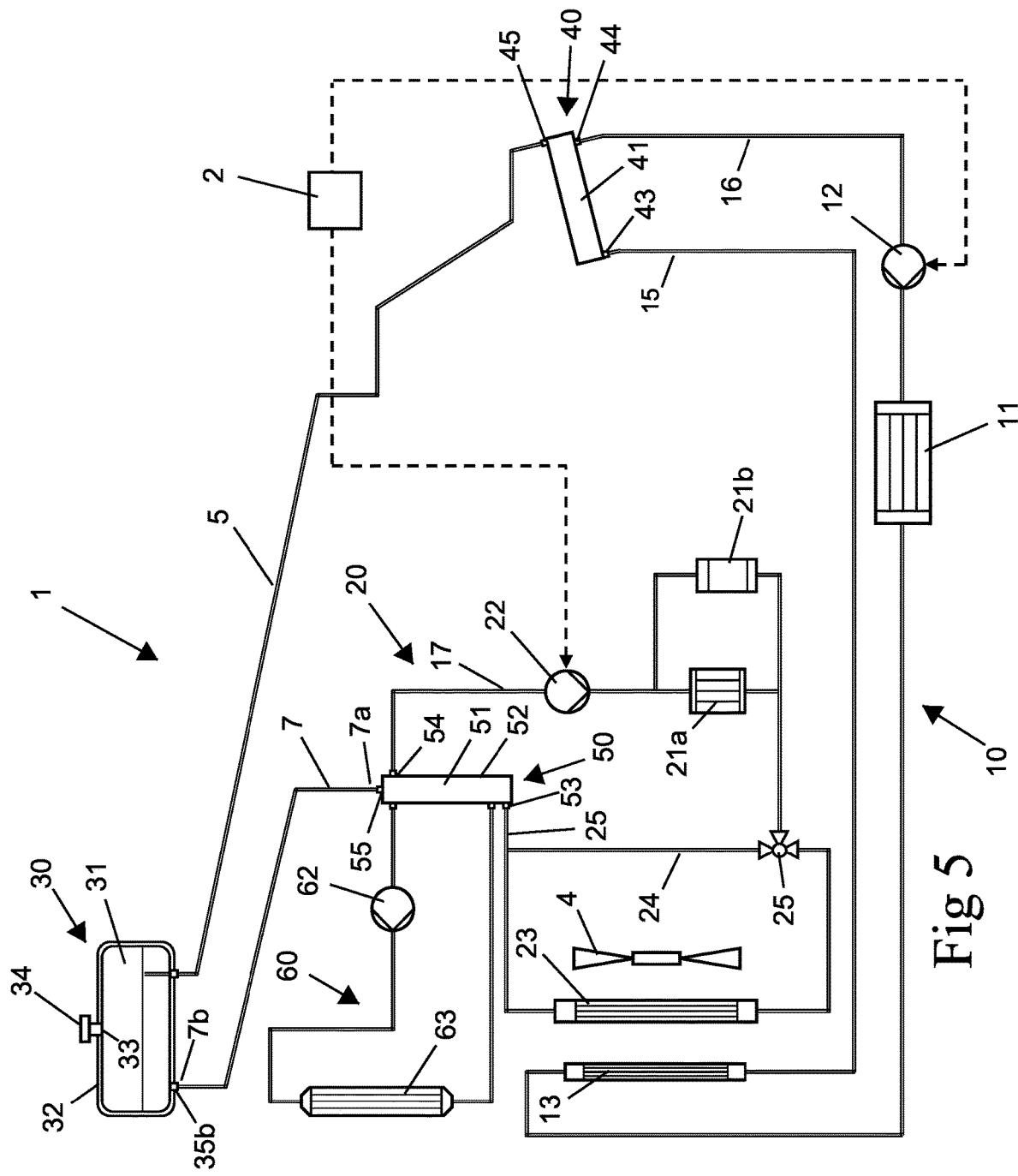
FIG. 5 is an outline diagram of a cooling system according to a fourth embodiment of the invention.

In the embodiments illustrated in FIGS. 4-6, the cooling system 1 comprises first and second cooling circuits 10, 20 essentially corresponding to the first and second cooling circuits described above with reference to FIG. 1. In these embodiments, the cooling system 1 comprises a first deaeration device 40 of the type described above arranged in the first cooling circuit 10 for separation of air bubbles from the coolant circulating in the first cooling circuit. Furthermore, the cooling system 1 also comprises a second deaeration device 50 arranged in the second cooling circuit 20 for separation of air bubbles from the coolant circulating in the second cooling circuit, wherein this deaeration device 50 is located at a lower position than the expansion tank 30 and connected to the expansion chamber 31 of the expansion tank 30 via a second static line 7 in order to allow air bubbles separated from the coolant in the second deaeration device 50 to migrate upwards in the second static line 7 towards the expansion chamber 31. In the illustrated examples, the second static line 7 is connected directly to the expansion chamber 31 via an opening 35b provided in the casing 32 of the expansion tank.

The second static line 7 has a lower end 7a and an upper end 7b, wherein the second static line 7 is connected to the second deaeration device 50 at its lower end 7a. In the embodiments illustrated in FIGS. 4-6, the second static line 7 slopes upwards along its entire length from its lower end 7a to its upper end 7b. However, the second static line 7 may as an alternative consist of a combination of one or more first length sections, each of which sloping upwards as seen in a direction along the second static line from its lower end towards its upper end, and one or more horizontal second length sections, wherein these first and second length sections are interconnected and arranged in series with each other.

In the embodiments illustrated in FIGS. 4-6, the second deaeration device 50 comprises a deaeration chamber 51, which is enclosed by a casing 52 and which has:
- a coolant inlet 53 connected to a feed pipe 25 of the second cooling circuit 20 in order to allow coolant circulating in the second cooling circuit to flow from the feed pipe 25 into the deaeration chamber 51 via this coolant inlet 53;
- a first coolant outlet 54 connected to the second coolant pump 22 in order to allow coolant to flow from the deaeration chamber 51 to the second coolant pump 22 via this first coolant outlet 54, wherein the second coolant pump 22 is arranged immediately downstream of the first coolant outlet; and
- a second coolant outlet 55 connected to the expansion chamber 31 via the second static line 7 and located at a higher position than the first coolant outlet 54.

The coolant inlet 53 and the first coolant outlet 54 are spaced apart from each other in a longitudinal direction of the deaeration chamber 51.

In the embodiment illustrated in FIGS. 4-6, the first coolant outlet 54 is connected to a first end of a second coolant pipe 17 and an inlet of the second coolant pump 22 is connected to a second end of the second coolant pipe 17.

The second coolant outlet 55 is located in an upper part of the deaeration chamber 51 in order to allow air bubbles that have migrated to the upper part of the deaeration chamber to leave the deaeration chamber and enter the second static line 7 via the second coolant outlet 55. Air bubbles may hereby be separated from the coolant in the second cooling circuit 20. The second coolant outlet 55 is preferably located at the highest point in the deaeration chamber 51, but it may as an alternative be located slightly below the highest point in the deaeration chamber 51.

The cross-sectional dimension of the deaeration chamber 51 is larger than the cross-sectional dimension of the feed pipe 25 such that the flow velocity of the coolant in the deaeration chamber 51 is lower than the flow velocity of the coolant in the feed pipe 25 leading to the deaeration chamber, to thereby allow air bubbles to be carried along with the rather rapid coolant flow in the feed pipe 25 and enter the deaeration chamber 51 via the coolant inlet 53 and thereafter migrate in the deaeration chamber 51 to the second coolant outlet 55. The slower coolant flow in the deaeration chamber 51 will give the coolant an increased dwell time in the deaeration chamber, which in its turn will give air bubbles in the coolant a chance to migrate in the deaeration chamber 51 to the second coolant outlet 55.

The cross-sectional dimension of the deaeration chamber 51 is preferably so much larger than the cross-sectional dimension of the feed pipe 25 that the relationship between the flow velocity $v3$ of the coolant flowing through the deaeration chamber 51 between the coolant inlet 53 and the first coolant outlet 54 and the flow velocity $v4$ of the coolant flowing through the feed pipe 25 is 1:2 or lower, preferably 1:3 or lower.

The deaeration chamber 51 may have a cylindrical shape, for instance a circular cylindrical shape, but it may as an alternative have any other suitable shape.

The electronic control unit 2 may be configured to control the second coolant pump 22 in such a manner that the flow velocity of the coolant circulating through the second cooling circuit 20 is maintained at such a value during normal operating conditions that the second cooling circuit is continuously deaerated during the normal operating conditions. However, the electronic control unit 2 may as an alternative be configured to control the second coolant pump 22 in such a manner that the flow velocity intermittently or only at specific occasions is set to a value adapted for an efficient deaeration of the coolant in the second cooling circuit 20.

In the embodiments illustrated in FIGS. 4-6, the second coolant outlet 55 is located in such a position in relation to the coolant inlet 53 and the first coolant outlet 54 that the coolant flow in the deaeration chamber 51 between the coolant inlet 53 and the first coolant outlet 54 will move migrating air bubbles in the deaeration chamber 51 in the longitudinal direction of the deaeration chamber 51 towards the second coolant outlet 55. Thus, in this case, the migration direction of the air bubbles in the deaeration chamber 51 corresponds to the flow direction of the coolant in the deaeration chamber and the coolant flow in the deaeration chamber 51 will thereby promote the movement of the air bubbles towards the second coolant outlet 55.

In the embodiments illustrated in FIGS. 4-6, the deaeration chamber 51 has an elongated shape and is arranged with its longitudinal axis 56 extending in vertical direction. However, the deaeration chamber 51 may as an alternative be arranged with its longitudinal axis 56 inclined in relation to a horizontal plane by an angle of 0-90°, e.g. by an angle which is >0° and <=90°, or by an angle of 10-90°, or 15-90°.

In the embodiments illustrated in FIGS. 5 and 6, the cooling system 1 also comprises a cab heating circuit 60. A third coolant pump 62 is provided in the cab heating circuit 60 in order to circulate the coolant in the cab heating circuit. Furthermore, a heat exchanger 63 configured to heat air to be supplied to the vehicle cab is provided in the cab heating circuit 60.

In the embodiment illustrated in FIG. 5, the cab heating circuit 60 is connected to the second deaeration device 50. In this case, the coolant circulating in the cab heating circuit 60 is deaerated in the second deaeration device 50 and this coolant is also configured to absorb heat in the second deaeration device 50 from hotter coolant circulating in the second cooling circuit 20.

In the embodiment illustrated in FIG. 6, the cooling system 1 comprises a third deaeration device 64 arranged in the cab heating circuit 60 for separation of air bubbles from the coolant circulating in the cab heating circuit, wherein this deaeration device 64 is located at a lower position than the expansion tank 30 and connected to the expansion chamber 31 of the expansion tank 30 via a third static line 9 in order to allow air bubbles separated from the coolant in the third deaeration device 64 to migrate upwards in the third static line 9 towards the expansion chamber 31. The third deaeration device 64 may be designed in the same manner as the first and/or second deaeration device 40, 50. In the embodiment illustrated in FIG. 6, a heating device 90 is provided in the cab heating circuit 60 in order to heat the coolant circulating in the cab heating circuit.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A cooling system comprising:
a first cooling circuit for cooling at least one first component by means of coolant circulating in the first cooling circuit;
a second cooling circuit for cooling at least one second component by means of coolant circulating in the second cooling circuit;
a first coolant pump for circulating coolant in the first cooling circuit;
a second coolant pump for circulating coolant in the second cooling circuit; and
an expansion tank provided with an expansion chamber for accumulation of coolant, wherein the expansion chamber is connected to the second cooling circuit to allow the expansion chamber to receive coolant from the second cooling circuit; and
a first deaeration device arranged in the first cooling circuit for separation of air bubbles from the coolant circulating in the first cooling circuit, wherein the first deaeration device is located at a lower position than the expansion tank and connected to said expansion chamber via a first static line to allow air bubbles separated from the coolant in the first deaeration device to migrate upwards in the first static line towards the expansion chamber, wherein the first deaeration device comprises a deaeration chamber having:
a coolant inlet connected to a feed pipe of the first cooling circuit to allow coolant circulating in the first cooling circuit to flow from the feed pipe into the deaeration chamber via the coolant inlet a first coolant outlet connected to the first coolant pump allow coolant to flow from the deaeration chamber to the first coolant pump via the first coolant outlet, wherein the first coolant pump is arranged immediately downstream of the first coolant outlet; and
a second coolant outlet connected to said expansion chamber via the first static line wherein the second coolant outlet is located at a higher position than the first coolant outlet.

2. A cooling system according to claim 1, wherein the coolant inlet and the first coolant outlet are spaced apart from each other in a longitudinal direction of the deaeration chamber, wherein the cross-sectional dimension of the deaeration chamber is larger than the cross-sectional dimension of the feed pipe to thereby allow air bubbles carried along with the coolant flowing through the feed pipe to enter the deaeration chamber via the coolant inlet and thereafter migrate in the deaeration chamber to the second coolant outlet.

3. A cooling system according to claim 2, wherein the cross-sectional dimension of the deaeration chamber is larger than the cross-sectional dimension of the feed pipe such that the relationship between a flow velocity of the coolant flowing through the deaeration chamber between the coolant inlet and the first coolant outlet and a flow velocity of the coolant flowing through the feed pipe is 1:2 or lower.

4. A cooling system according to claim 2, wherein the second coolant outlet is located in such a position in relation to the coolant inlet and the first coolant outlet that the coolant flow in the deaeration chamber between the coolant inlet and the first coolant outlet will move said migrating air bubbles in the longitudinal direction of the deaeration chamber towards the second coolant outlet.

5. A cooling system according to claim 4, wherein the deaeration chamber has an elongated shape and is arranged with its longitudinal axis vertical or inclined in relation to a horizontal plane by an angle ($\alpha$) in the range of one of:
0-90°;
10-90°; or
15-90°.

6. A cooling system according to claim 1, wherein the first static line has a lower end and an upper end, wherein the first static line is connected to the first deaeration device at its lower end and wherein one of:
the first static line slopes upwards along its entire length from its lower end to its upper end; or
the first static line is formed by several interconnected length sections which are arranged in series with each other and which consist of one or more first length sections, each of which sloping upwards as seen in a direction along the first static line from its lower end towards its upper end, and one or more horizontal second length sections.

7. A cooling system according to claim 1, further comprising a second deaeration device arranged in the second cooling circuit for separation of air bubbles from the coolant circulating in the second cooling circuit, wherein the second deaeration device is located at a lower position than the expansion tank and connected to said expansion chamber via a second static line to allow air bubbles separated from the coolant in the second deaeration device to migrate upwards in the second static line towards the expansion chamber.

8. A cooling system according to claim 7, wherein the second deaeration device comprises a deaeration chamber comprising:
a coolant inlet connected to a feed pipe of the second cooling circuit to allow coolant circulating in the second cooling circuit to flow from the feed pipe into the deaeration chamber of the second deaeration device via the coolant inlet;
a first coolant outlet connected to the second coolant pump to allow coolant to flow from the deaeration chamber of the second deaeration device to the second coolant pump via the first coolant outlet, wherein the second coolant pump is arranged immediately downstream of the first coolant outlet; and
a second coolant outlet connected to said expansion chamber via the second static line and located at a higher position than the first coolant outlet of the deaeration chamber of the second deaeration device,
wherein the cross-sectional dimension of the deaeration chamber of the second deaeration device is larger than the cross-sectional dimension of the feed pipe of the second cooling circuit to thereby allow air bubbles carried along with the coolant flowing through the feed pipe of the second cooling circuit to enter the deaeration chamber of the second deaeration device via the coolant inlet and thereafter migrate in the deaeration chamber to the second coolant outlet.

9. A cooling system according to claim 8, wherein the cross-sectional dimension of the deaeration chamber of the second deaeration device is larger than the cross-sectional dimension of the feed pipe of the second cooling circuit such that the relationship between the flow velocity of the coolant flowing through the deaeration chamber between the coolant inlet and the first coolant outlet and the flow velocity of the coolant flowing through the feed pipe is 1:2 or lower.

10. A cooling system according to claim 8, wherein the second coolant outlet of the deaeration chamber of the second deaeration device is located in such a position in relation to the coolant inlet and the first coolant outlet of the deaeration chamber that the coolant flow in the deaeration chamber between the coolant inlet and the first coolant outlet will move said migrating air bubbles in the longitudinal direction of the deaeration chamber towards the second coolant outlet.

11. A cooling system according to claim 10, wherein the deaeration chamber of the second deaeration device has an elongated shape and is arranged with its longitudinal axis vertical or inclined in relation to a horizontal plane by an angle ($\alpha$) of one of:
0-90°;
10-90°; or
15-90°.

12. A cooling system according to claim 7, wherein the second static line has a lower end and an upper end, wherein the second static line is connected to the second deaeration device at its lower end and wherein one of:
the second static line slopes upwards along its entire length from its lower end to its upper end; or
the second static line is formed by several interconnected length sections which are arranged in series with each other and which consist of one or more first length sections, each of which sloping upwards as seen in a direction along the second static line from its lower end towards its upper end, and one or more horizontal second length sections.

13. A cooling system according to claim 1, further comprising a radiator for cooling of coolant circulating in the first cooling circuit and/or a radiator for cooling of coolant circulating in the second cooling circuit.

14. A cooling system according to claim 1, wherein the first cooling circuit is a low temperature cooling circuit, and that the second cooling circuit is a high temperature cooling circuit.

15. A vehicle comprising a cooling system comprising
a first cooling circuit for cooling at least one first component by means of coolant circulating in the first cooling circuit;
a second cooling circuit for cooling at least one second component by means of coolant circulating in the second cooling circuit;
a first coolant pump for circulating coolant in the first cooling circuit;
a second coolant pump for circulating coolant in the second cooling circuit; and
an expansion tank provided with an expansion chamber for accumulation of coolant, wherein the expansion chamber is connected to the second cooling circuit to allow the expansion chamber to receive coolant from the second cooling circuit; and
a first deaeration device arranged in the first cooling circuit for separation of air bubbles from the coolant circulating in the first cooling circuit, wherein the first deaeration device is located at a lower position than the expansion tank and connected to said expansion chamber via a first static line to allow air bubbles separated from the coolant in the first deaeration device to migrate upwards in the first static line towards the expansion chamber, wherein the first deaeration device comprises a deaeration chamber having:
a coolant inlet connected to a feed pipe of the first cooling circuit to allow coolant circulating in the first cooling circuit to flow from the feed pipe into the deaeration chamber via the coolant inlet;
a first coolant outlet connected to the first coolant pump to allow coolant to flow from the deaeration chamber to the first coolant pump via the first coolant outlet, wherein the first coolant pump is arranged immediately downstream of the first coolant outlet; and
a second coolant outlet connected to said expansion chamber via the first static line wherein the second coolant outlet is located at a higher position than the first coolant outlet.

16. A cooling system according to claim 2, wherein the cross-sectional dimension of the deaeration chamber is larger than the cross-sectional dimension of the feed pipe such that the relationship between a flow velocity of the coolant flowing through the deaeration chamber between the coolant inlet and the first coolant outlet and a flow velocity of the coolant flowing through the feed pipe is 1:3 or lower.

17. A cooling system according to claim 4, wherein the deaeration chamber has an elongated shape and is arranged with its longitudinal axis vertical or inclined in relation to a horizontal plane by an angle ($\alpha$) in the range of greater than 0° and less than or equal to 90° (>0° and <=90°).

18. A cooling system according to claim 8, wherein the cross-sectional dimension of the deaeration chamber of the second deaeration device is larger than the cross-sectional dimension of the feed pipe of the second cooling circuit such that the relationship between the flow velocity of the coolant flowing through the deaeration chamber between the coolant inlet and the first coolant outlet and the flow velocity of the coolant flowing through the feed pipe is 1:3 or lower.

19. A cooling system according to claim 10, wherein the deaeration chamber of the second deaeration device has an elongated shape and is arranged with its longitudinal axis vertical or inclined in relation to a horizontal plane by an angle (a) in the range of greater than 0° and less than or equal to 90° (>0° and <=90°).

\* \* \* \* \*

UNITED STATES PATENT AND TRADEMARK OFFICE
CERTIFICATE OF CORRECTION

PATENT NO. : 11,732,636 B2
APPLICATION NO. : 17/917814
DATED : August 22, 2023
INVENTOR(S) : Martin Mohlin and Ola Hall It is certified that error appears in the above-identified patent and that said Letters Patent is hereby corrected as shown below:

In the Claims

In Column 16, Claim 1, Line 9, should read:
ant outlet connected to the first coolant pump to allow In Column 19, Claim 19, Line 8, should read:
angle (α) in the range of greater than 0° and less than or equal Signed and Sealed this
Seventh Day of November, 2023

Katherine Kelly Vidal
*Director of the United States Patent and Trademark Office*